Figure 1:
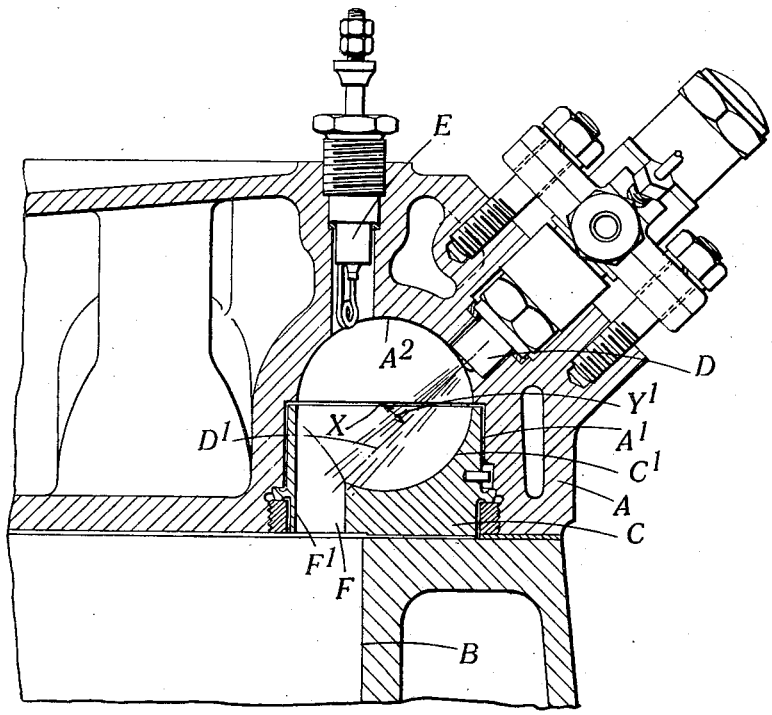

March 29, 1938.   H. R. RICARDO   2,112,787
INTERNAL COMBUSTION ENGINE EMPLOYING LIQUID
FUEL INJECTION AND COMPRESSION IGNITION
Filed Feb. 4, 1937    2 Sheets-Sheet 1

Inventor
Harry Ralph Ricardo
By Watson, Coit, Morse
& Grindle,   Att'ys

Patented Mar. 29, 1938

2,112,787

UNITED STATES PATENT OFFICE 2,112,787

INTERNAL COMBUSTION ENGINE EMPLOYING LIQUID FUEL INJECTION AND COMPRESSION IGNITION

Harry Ralph Ricardo, London, England

Application February 4, 1937, Serial No. 124,141
In Great Britain February 13, 1936

3 Claims. (Cl. 123—32)

This invention relates to internal combustion engines of the liquid fuel injection compression ignition type and including a spherical combustion chamber situated external to the cylinder with which it communicates through at least one passageway formed in an inserted plug which is externally cylindrical and constructed and arranged so that there is no free flow of heat therefrom to the part immediately surrounding the plug, a fuel jet nozzle being situated within the external combustion chamber. Examples of engines having these characteristics are described and shown in the specifications and drawings of the present applicant's U. S. Patent 2,003,311 and applications Nos. 759,392 and 24,145.

In an engine of the above type and according to the present invention two similar and cylindrical passages are formed in the inserted plug and lead from the cylinder to the spherical combustion chamber, these passages being spaced apart and symmetrically disposed on either side of a plane containing the axis of the plug with the axes of the passages parallel, or nearly so, both to each other and to the plug axis, that part of the surface of each cylindrical passage which lies furthest from the centre of the spherical combustion chamber being tangential to the inner spherical surface of the combustion chamber, the jet nozzle being formed and arranged so as to deliver a jet of fuel whose axis lies in a plane containing the plug axis and at a perpendicular distance from the centre of the spherical combustion chamber which is between one-third and one-half of the radius of the said combustion chamber, the jet axis meeting the wall of the combustion chamber at a point situated near the orifices of the passages in the plug.

In one arrangement the axis of the jet meets the wall of the spherical combustion chamber at that side of the passage orifices over which the air entering the combustion chamber through the passages flows as it rotates after passing the jet nozzle. In another arrangement the jet axis meets the wall of the spherical combustion chamber at that side of the passage orifices over which the air entering the chamber flows before passing the jet nozzle.

The spacing apart of the twin passageways through the plug may be defined as a distance between the axes of these holes which is from 1.2 to 1.5 of the diameter of one of the holes. Where the axes of the passageway holes run nearly but not actually parallel, this spacing apart distance is measured at or towards the ends of the passageways as they enter the combustion chamber. It will be apparent that the diameters of the holes are necessarily determined on the one hand by the diameter of the spherical combustion chamber and on the other hand by the requisite spacing apart of the holes as above indicated. If the passageway axes are not actually parallel, the extent of their deviation from parallelism must be determined, at least as to the limit of deviation, on the one hand by the spacing apart of the orifices of the passageways in the chamber in accordance with the above-mentioned distance, and on the other hand by the diameter of the plug through which these passageways run.

The placing of the jet nozzle in the wall of the combustion chamber and the directioning of the axis of the jet of fuel issuing therefrom may be so determined that the charge of air forced into the chamber at the end of the compression stroke as the air rotates within the chamber owing to the tangential disposition of the passageways through the plug, will flow first past the nozzle and that part of the fuel jet adjacent to the nozzle, and subsequently this air stream will flow a second time past the jet axis before the air stream comes to the passageway orifices. The perpendicular distance of the jet axis from the centre of the chamber is determined so as to allow some portion of the cone of the fuel constituting the jet to pass and tend to be carried "down-stream" by the air stream close to the hot wall of the plug, while at the same time maintaining the body of the fuel jet well in the stream of the rotating air.

According to another arrangement the placing of the jet nozzle in the wall of the combustion chamber and the directioning of the axis of the jet of fuel is so determined that the charge of air forced into the chamber at the end of the compression stroke will flow first past the jet axis where this meets the wall of the spherical combustion chamber adjacent to the passageway orifices and will subsequently flow past the nozzle and that part of the fuel jet adjacent to the nozzle.

Where the axes of the passageways are parallel to each other and to a plane containing the plug axis, the air streams through these passageways will converge at a point on the "upstream" side of the jet nozzle. Where the passageway axes run otherwise than parallel, and at a small angle so that these axes converge at a point outside the cylinder and beyond the cylinder head, the air streams through the passageways will converge on the "upstream" side of the jet nozzle but further from this nozzle.

It is of importance that where each passageway through the plug opens into the combustion chamber, a part of the wall of each passageway at its orifice merges tangentially and smoothly into the contour of the spherical chamber in order to ensure the smooth flow of the air stream into the chamber and the substantially uninterrupted rotational movement of this air stream at least as it passes initially over the wall of the chamber.

The spherical combustion chamber may be situated in the head of the cylinder or at the side of the cylinder. The main wall of this chamber is suitably cooled. The disposition of this chamber and of the hot plug and passageways therethrough, when the chamber is located in the cylinder head, may be such that the initial rotation of the air streams entering the chamber may be in a direction away from the cylinder axis, a direction which may conveniently be referred to as "clockwise", or in the opposite direction, which may conveniently be referred to as "anti-clockwise". Similarly, when the chamber is disposed at the side of the cylinder, the chamber and plug may be arranged so that the initial rotation of the air stream therein may take place in either a clockwise or anti-clockwise direction about an axis passing through the centre of the chamber and normal to the plane in which lie the axes of the plug and of the fuel jet. In some cases it may be convenient to dispose the chamber and hot plug so that the plane containing the axes of the plug and fuel jet is "offset" laterally with respect to a radial plane extending from the cylinder axis.

Figure 2:
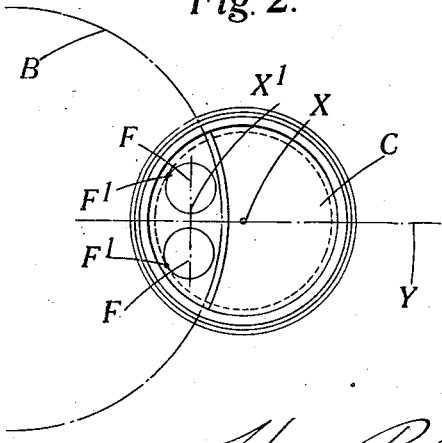
Figure 3:
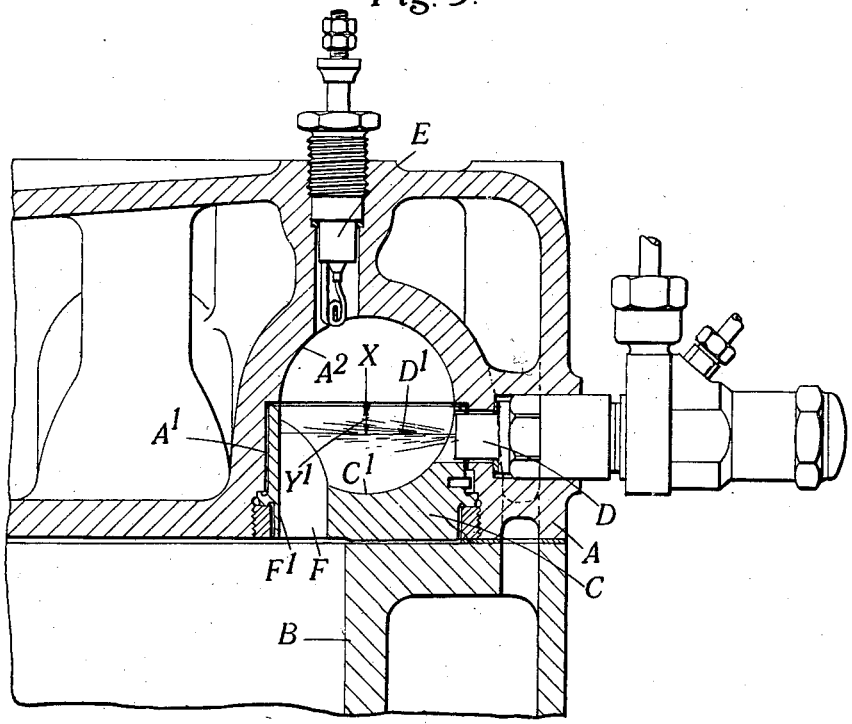
Figure 4:
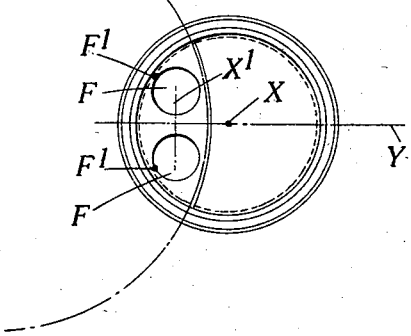

In the accompanying drawings,

Figure 1 is a vertical section through a part of the cylinder and cylinder head of an internal combustion engine embodying the invention, Figure 2 is a bottom plan showing the arrangement of the passageways through the inserted plug, and Figures 3 and 4 are views similar to Figures 1 and 2 respectively, but of a modified construction also according to the invention.

Each of the two constructions illustrated in the drawings has certain primary or characteristic features which are to be found in the engines described and shown in the specifications and drawings of the present applicant's prior patent and applications referred to above. That is to say, there is a pocket $A^1$ formed external to the cylinder B and arranged in the cylinder head A. In the mouth of the pocket $A^1$ which opens into the cylinder B there is a plug member C constructed and arranged so that there is no free flow of heat from this plug to the parts immediately surrounding it. The inner face of the plug C is contoured at $C^1$ so that it combines with a hemispherical portion $A^2$ of the interior of the pocket $A^1$ to form a spherical combustion chamber. Arranged in the cylinder head A is a jet nozzle D from which liquid fuel is delivered into the spherical combustion chamber, a heater plug E of known type being arranged in the wall of the spherical combustion chamber with a view to facilitating starting.

The inserted plug C is externally cylindrical and the hemispherical contour $C^1$ has its centre coincident with the centre X of the spherical chamber and preferably situated on the axis of the plug C. The liquid fuel issues as a conical jet from the nozzle D and the axis $D^1$ of this jet lies in the plane which also contains the axis of the plug C and the centre X of the spherical chamber. For convenience this plane, which is indicated at Y in Figure 2, may be referred to as the reference plane.

In some cases the centre X of the combustion chamber may be offset from or arranged to one side of the axis of the plug C, but this offsetting is effected so that the centre X of the combustion chamber will still lie in the plane of reference. The whole chamber may be so arranged in relation to the cylinder B that the plane of reference will lie radial to and contain the axis of the cylinder B. If found desirable, however, the reference plane may be offset to one side or the other of the axis of the cylinder B and a radial plane extending from that axis, in a manner such as is indicated in the specification and shown in certain of the appended drawings of the present applicant's above-mentioned application No. 759,392.

Through the plug C there run two similar and cylindrical passages F, formed for example by drilling, each passageway leading from the cylinder B through the plug C into the spherical combustion chamber. The passages F are spaced apart and symmetrically disposed on either side of the reference plane Y, the axes of the passages being preferably parallel to each other and to the axis of the plug C. Each passage F is so formed, that is to say as to its diameter, and so positioned relatively to the axis of the plug C and in relation to the diameter of the spherical combustion chamber, that a section taken in a radial plane containing the axis of the plug C and the axis of one of the passages F will show a part of the wall of the said passage remote from the axis of the plug C as a line which runs parallel to the axis of the said passage and is tangential to the circle defined by the contour of the spherical combustion chamber. Thus, as will be seen from the drawings, that generator indicated at $F^1$ of each of the cylindrical passages F lying furthest from the centre X of the spherical combustion chamber is substantially tangential to the inner spherical surface of the combustion chamber.

The axes of the passages F are spaced apart a distance which may be defined as measuring from 1.2 to 1.5 of the diameter of each passage, the line indicated at $X^1$ which extends between the axes of the passages F and along which this spacing apart is thus measured being normal to the plane of reference Y.

The two passages F, when the plug C is viewed from the interior of the cylinder B, present the appearance of nostrils through which the gases can pass from the cylinder B into the spherical combustion chamber during the compression stroke of the piston, and from the combustion chamber into the cylinder B when the charge is ignited and during the outstroke of the piston within the cylinder B.

The disposition of the jet nozzle D in the wall of the spherical combustion chamber and the formation of this nozzle are such that the axis $D^1$ of the jet of fuel issuing from the nozzle D, which axis, as mentioned, lies in the reference plane, will meet the wall of the spherical combustion chamber at a point adjacent to the orifices of the passages F within the spherical chamber. As clearly shown in Figure 1, this point lies on what may be termed the "upstream" side of the plane $X^1$ containing the axes of the passages F. That is to say, the air charge as it rotates within the spherical combustion chamber, after entering through the nostril passages F, will flow first past the jet nozzle D and then over the surface of the hot plug C to the orifices of the passages F near which this air stream will meet the fuel jet for the second time and will pass over the point in the wall of the spherical combustion chamber towards which the jet axis $D^1$ is directed.

The position and direction of the jet axis $D^1$ in relation to the centre of the spherical combustion chamber may be defined in the reference plane Y as measured by the perpendicular distance indicated at $Y^1$ from the centre X of the spherical chamber to the jet axis $D^1$, which distance measures approximately one-third of the radius of the chamber.

The air streams entering the spherical combustion chamber through the two nostril passages F, when the axes of these passages are parallel to each other and to the axis of the plug C, converge at a place on the "upstream" side of the nozzle D, that is to say at a place which lies adjacent to the wall of the combustion chamber between the jet nozzle D and the places where the air streams enter tangentially into the spherical combustion chamber.

In the modified arrangement shown in Figures 3 and 4, the jet nozzle D is so arranged that the axis $D^1$ of the fuel jet meets the wall of the combustion chamber at a point situated near the orifices of the passages F and at the side thereof over which the air, on entering, flows before passing the jet nozzle D. The point at which the jet axis $D^1$ meets the surface of the spherical combustion chamber will thus lie on what may be termed the "downstream" side of the plane $X^1$ containing the axes of the two passages F. That is to say, the air charge as it enters the spherical combustion chamber will first pass over the point in the wall of the chamber towards which the fuel jet is directed and will then flow past the jet nozzle D after which it will flow over the surface of the hot plug C.

As in the construction above described with reference to Figures 1 and 2, the perpendicular distance $Y^1$ between the centre X of the combustion chamber and the jet axis $D^1$, is approximately one-third of the radius of the combustion chamber. Further, that generator $F^1$ of each of the passages F lying furthest from the centre X of the combustion chamber is tangential to the inner spherical surface of this chamber.

It will be understood that in each of the constructions above described the arrangement is such that the cone of the fuel jet extends over an appreciable part of each of the orifices at the inner ends of the passages F, with the jet axis $D^1$ lying in the plane of reference Y, that is to say midway between the passages F.

The point at which the jet axis $D^1$ meets the wall of the combustion chamber may be determined to suit requirements but it should be understood that the nearer the said point lies to the plane $X^1$ the wider should be the area covered by the fuel cone, so as to ensure that the entering air sweeps over an appreciable part of the area covered by the cone.

Instead of the nostril passages F having their axes actually parallel, they may be arranged so that these axes either converge or diverge slightly as the passages open into the combustion chamber. Each passage must, however, then be so arranged that the air stream therethrough will enter the combustion chamber tangentially with respect to the contour of that chamber so that there shall be no interference with the smooth flow of the air stream into the chamber and the rotational effect therein produced on these air streams. As indicated, the extent to which the convergence or divergence of the axes of the passages deviates from parallelism, would be only measured as a small angle. This angle would be determined by the dimensions of the associated parts and the spacing apart and general positioning of the passageway orifices.

According as to whether the passageways converge or diverge, so will alter the place in the combustion chamber where the air streams will tend to meet, that is to say, this meeting place will either be further in advance of or nearer to the jet nozzle.

While the invention may be applied to engine structures in which substantially the whole of the combustion space is comprised in the external combustion chamber and nostril passages, according to the arrangements indicated in the specifications and appended drawings of certain of the present inventor's prior patents referred to above, it may also be applied to that arrangement described in the specification of the patent application No. 24,145, wherein not more than 50% of the total volume of the combustion space is constituted by the external combustion chamber and the nostril passageways, the remainder of the combustion space being constituted by the space between the face of the piston and the end of the cylinder at the end of the compression stroke, which space may be increased locally adjacent to the orifices of the nostril passageways where these passageways open into the cylinder.

It will be understood that the constructions herein described and shown in the drawings are given by way of example only and that details may be modified. For example, though in each of the constructions above described the pocket or combustion chamber is formed in the cylinder head, this pocket may be disposed at the side of the cylinder. Further, the perpendicular distance between the centre of the combustion chamber and the jet axis may be determined to suit requirements and may be from one-quarter to one-half of the radius of the spherical combustion chamber.

I claim:

1. An internal combustion engine of the liquid fuel injection compression ignition type including, in combination, a cylinder, means defining a combustion chamber communicating with said cylinder, such means comprising a structure providing a pocket having a mouth, and an inserted externally cylindrical plug so supported in said mouth that there is no free flow of heat from the plug to the part immediately surrounding it, a fuel jet nozzle situated within the combustion chamber, two similar and cylindrical passages formed in the plug and leading from the cylinder to the spherical combustion chamber, these passages being spaced apart and symmetrically disposed on either side of a plane containing the axis of the plug with the axes of the passages substantially parallel, both to each other and to the plug axis, said passages constituting the sole means of communication between the cylinder and combustion chamber, that part of the surface of each cylindrical passage which lies furthest from the centre of the spherical combustion chamber being tangential to the inner spherical surface of the combustion chamber, the jet nozzle being formed and arranged so as to deliver a jet of fuel whose axis lies in a plane containing the plug axis, and at a perpendicular distance from the centre of the spherical combustion chamber which is between one-third and one-half of the radius of the spherical combustion chamber, the jet axis meeting the wall of the combustion chamber at a point situated near the orifices of the passages in the plug.

2. An internal combustion engine as claimed in claim 1 in which the axis of the jet meets the wall of the spherical combustion chamber at a point situated near the passage orifices and at the side thereof over which the air entering the chamber through the passages flows as it rotates after passing the jet nozzle.

3. An internal combustion engine as claimed in claim 1, in which the jet axis meets the wall of the spherical combustion chamber at a point situated near the passage orifices and at the side thereof over which the air entering the chamber flows before passing the jet nozzle.

HARRY RALPH RICARDO.